United States Patent
Pelfrey

(10) Patent No.: US 9,412,263 B2
(45) Date of Patent: Aug. 9, 2016

(54) INTERACTIVE PORTABLE CARRYING CASE FOR HAND SANITIZER

(71) Applicant: GOJO Industries, Inc., Akron, OH (US)

(72) Inventor: Keith Allen Pelfrey, Wadsworth, OH (US)

(73) Assignee: GOJO Industries, Inc., Akron, OH (US)

(*) Notice: Subject to any disclaimer, the term of this patent is extended or adjusted under 35 U.S.C. 154(b) by 255 days.

(21) Appl. No.: 13/833,559

(22) Filed: Mar. 15, 2013

(65) Prior Publication Data

US 2014/0266575 A1    Sep. 18, 2014

(51) Int. Cl.
*G05B 19/00* (2006.01)
*G08C 17/02* (2006.01)
*A47K 5/12* (2006.01)
*H04Q 9/00* (2006.01)
*B05B 11/04* (2006.01)
*B05B 11/00* (2006.01)
*B65D 83/14* (2006.01)

(52) U.S. Cl.
CPC .............. *G08C 17/02* (2013.01); *A47K 5/1201* (2013.01); *A47K 5/1217* (2013.01); *H04Q 9/00* (2013.01); *B05B 11/04* (2013.01); *B05B 11/308* (2013.01); *B65D 83/753* (2013.01)

(58) Field of Classification Search
CPC ..... G08B 21/245; B05B 11/04; B05B 11/308
USPC .......................................................... 340/5.2
See application file for complete search history.

(56) References Cited

U.S. PATENT DOCUMENTS

| | | | |
|---|---|---|---|
| 6,283,334 | B1 | 9/2001 | Mahaffey et al. |
| 6,375,038 | B1* | 4/2002 | Daansen et al. ................. 222/52 |
| 8,006,902 | B2 | 8/2011 | Garber et al. |
| 8,150,321 | B2 | 4/2012 | Winter et al. |
| 8,212,735 | B2 | 7/2012 | Hyvonen et al. |
| 8,240,508 | B2 | 8/2012 | Wegelin et al. |
| 8,243,217 | B2 | 8/2012 | Pelfrey |
| 8,335,473 | B2 | 12/2012 | Liao |
| 2002/0175182 | A1* | 11/2002 | Matthews ......................... 222/52 |
| 2004/0021068 | A1* | 2/2004 | Staats ............................. 250/288 |
| 2007/0273525 | A1 | 11/2007 | Garber et al. |
| 2010/0094581 | A1 | 4/2010 | Cagle |
| 2011/0011886 | A1* | 1/2011 | Zaima et al. ......................... 222/1 |
| 2011/0101029 | A1* | 5/2011 | Lewis et al. ................. 222/153.03 |
| 2012/0248149 | A1 | 10/2012 | Pelfrey |
| 2013/0015956 | A1 | 1/2013 | Wegelin et al. |

* cited by examiner

*Primary Examiner* — Vernal Brown
(74) *Attorney, Agent, or Firm* — Cooper Legal Group, LLC

(57) ABSTRACT

A dispensing system is provided including a housing that removably supports a container. A material is contained within the container. The material is dispensed from the container. The housing includes a wireless communication system that transmits a first set of information related to a user of the dispensing system. An example method of operating the dispensing system is also provided.

21 Claims, 10 Drawing Sheets

INTERACTIVE PORTABLE CARRYING CASE FOR HAND SANITIZER

TECHNICAL FIELD

The instant application is generally directed towards a dispensing system. For example, the instant application is directed towards a dispensing system that allows for a transfer of information.

BACKGROUND

Dispensing systems can store and selectively dispense a sanitizing material (e.g., soap, hand sanitizer, cleaners, disinfectants, moisturizers etc.). As such, dispensing systems are commonly used in a number of different environments to improve sanitation and cleanliness, for example. Dispensing systems can be used, for example, in schools, hospitals, factories, restaurants, etc., whereupon a user of the dispensing system can dispense the sanitizing material to clean his/her hands, clean an area within one of these environments, or the like.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

A dispensing system is provided herein that allows for the transfer or communication of data or information. For example, in a school or other environment, children and teens are often shy and/or nervous when meeting other people. Thus, a dispensing system as provided herein improves social interaction between these individuals, such as by communicating information about the user (e.g., the student) of the dispensing system to another user (e.g., another student) of another dispensing system. In another example, a dispensing system as provided herein may be used to track compliance issues. For example, the dispensing system may be used in a hospital, factory and/or other enterprise environment to facilitate hand washing or sanitization of areas within the environment (e.g., rooms, bathrooms, tables, etc.). In an example, the dispensing system may track or otherwise indicate whether a dispensing event occurred and thus whether an employee sanitized their hands, for example, such as upon entering a room where such an operation is expected to have occurred.

In an example, a dispensing system is provided. The dispensing system comprises a housing configured to removably support a container within which a material is contained and from which the material is dispensed. The housing comprises a wireless communication system configured to transmit a first set of information related to a user of the dispensing system.

In another example, a dispensing system is provided comprising a housing configured to removably support a container within which a material is contained and from which the material is dispensed. The housing is configured to store a first set of information related to a user of the dispensing system. The housing comprises a mating portion configured to engage a keying feature of the container to activate the housing when the housing supports the container. The housing may also comprise a wireless communication system configured to transmit the first set of information to a second housing and receive a second set of information from the second housing when the housing is in proximity to the second housing when the housing is activated. The housing may comprise at least one of an audio device for audibly conveying at least one of at least some of the first set of information to the second user or at least some of the second set of information to the user. The housing may also comprise a visual device for visually conveying at least one of at least some of the first set of information to the second user or at least some of the second set of information to the user.

In another example, a method of operating a dispensing system is provided. The method comprises receiving into a housing a container within which a material is contained and from which the material is dispensed, the container is received such that a keying feature of the container engages a mating portion of the housing to activate the housing. The method comprises maintaining a first set of information related to a user of the dispensing system within the housing. The method comprises at least one of transmitting the first set of information to a second housing that is in proximity to the housing or receiving a second set of information from the second housing when the housing is activated.

The following description and annexed drawings set forth certain illustrative aspects and implementations. These are indicative of but a few of the various ways in which one or more aspects can be employed. Other aspects, advantages, and novel features of the disclosure will become apparent from the following detailed description when considered in conjunction with the annexed drawings.

DETAILED DESCRIPTION

Figure 1:
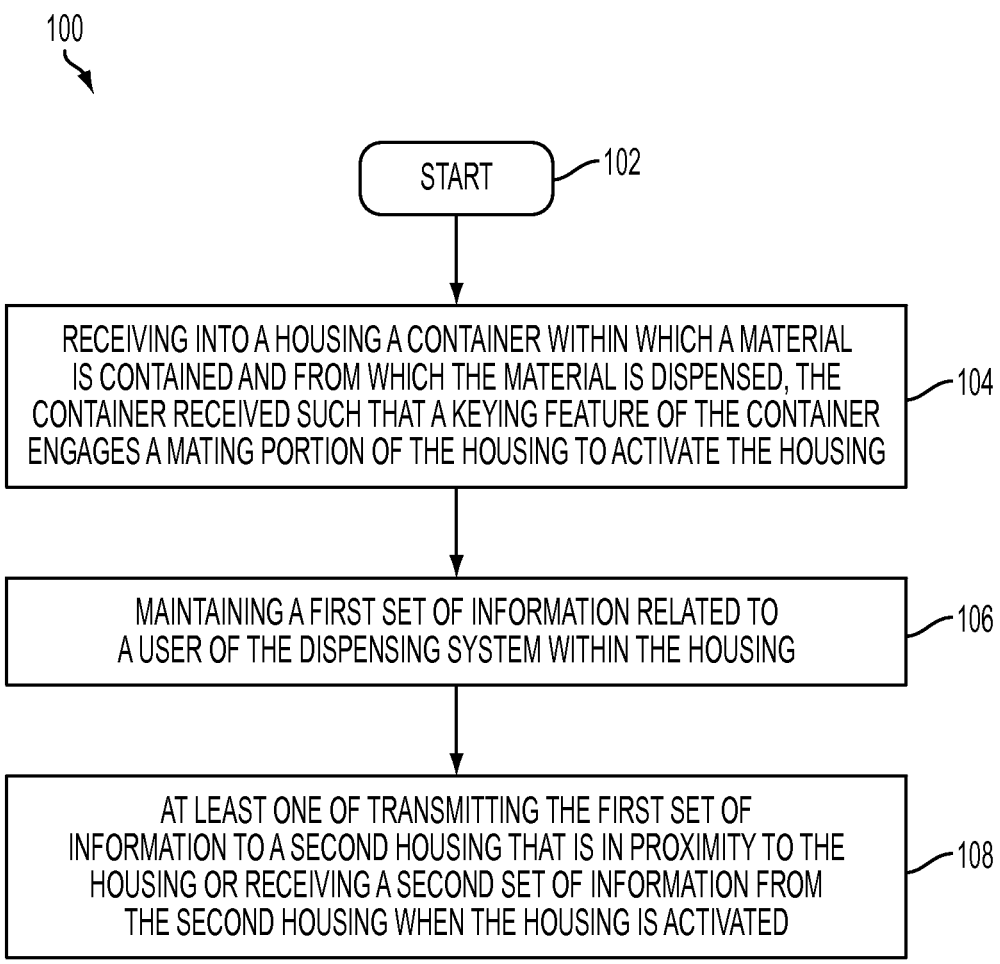
FIG. 1 is a flow diagram illustrating an example method of operating a dispensing system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

Turning to FIG. 1, an example method 100 of operating a dispensing system is illustrated. The method 100 can be used in association with some or all of the features illustrated in FIGS. 2 to 11. At 102, the method 100 starts. The dispensing system can dispense a material, such as a liquid, powder, gel, or the like, from a container. At 104, the container can be received within a housing. The container can include a keying feature that is unique to the container. Likewise, the housing can include a mating portion that can engage the keying feature. When the housing receives the container, the keying feature of the container engages the mating portion of the housing to activate the housing. In an example, if a container that does not include the keying feature is inserted into the housing, the housing may not be activated.

At 106, a first set of information is maintained within the housing. In an example, the first set of information is related to a user of the dispensing system. The first set of information can include the user's name, a sound or piece of music chosen by the user, or the like. In other examples, the first set of information can include information pertaining to the user's activities. For example, if the user walks into a room, the location of the user can be stored and maintained as part of the first set of information. In another example, if the user dispenses material from the dispensing system, this dispensing event can be stored and maintained as part of the first set of information.

At 108, the method 100 includes at least one of transmitting the first set of information to a second housing that is in proximity to the housing or receiving a second set of information from the second housing when the housing is activated. In an example, the second housing can be part of a second dispensing system that is similar or identical to the dispensing system. In such an example, when the dispensing system and second dispensing system are in proximity, the first set of information can be transmitted to the second dispensing system. In an example, the second housing can comprise a base station receiving unit, etc. of a compliance or communication system or the like. For example, the first set of information can be transmitted to a system that monitors dispensing events for compliance or other purposes, for example. Accordingly, the first set of information may be transmitted upon the housing entering an area where a dispensing event is expected to occur (e.g., electronics of the housing may detect entry of the area, such as receiving a signal emitted in the area, and may transmit information indicating whether or not a dispense event occurred).

The housing can alternatively, or additionally, receive a second set of information from the second housing. In this example, the second set of information can be related to a second user of the second dispensing system. The second set of information can include, for example, the second user's name, a sound or piece of music chosen by the second user, or the like. In an example, the second housing (e.g., and/or the housing) can include sensors, data tags (e.g., RFID tags, NFC tags, etc.), or the like. In such an example, the second set of information (e.g., and/or the first set of information) can include a unique tag identification that is specific to each sensor, data tag, etc. This unique tag identification can be indicative of the location of that particular sensor, data tag, etc. within an environment. As such, the second housing can transmit this second set of information to the housing when in proximity to the housing.

Figure 2:
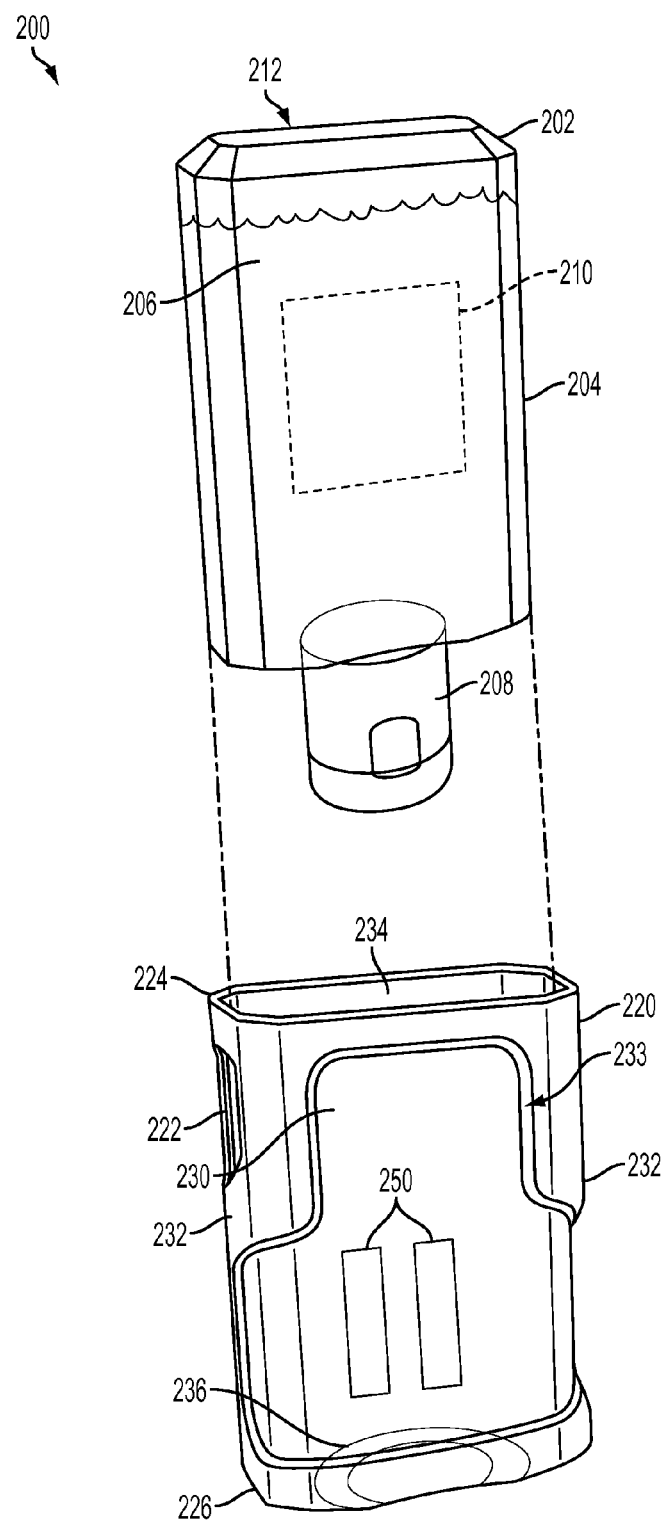
FIG. 2 is an illustration of an example dispensing system in which a container is in a removed/detached state from a housing.

Turning now to FIG. 2, a dispensing system 200 is illustrated. The dispensing system 200 is illustrated in a partially exploded state so as to more clearly illustrate the features of the dispensing system 200. In general, the dispensing system 200 can be used for storing and/or dispensing a material.

The dispensing system 200 includes a container 202. The container 202 is somewhat generically/schematically depicted, as the container 202 includes any number of sizes, shapes, and structures. Indeed, it is appreciated that the container 202 depicted in FIG. 2 includes only one of any number of types of containers, bottles, vessels, or the like.

The container 202 includes a body portion 204. The body portion 204 defines a substantially hollow interior into which a material 206 can be held. The body portion 204 includes any number of sizes, so as to hold a variety of quantities of the material 206. In a possible example, the body portion 204 is sized to hold approximately one ounce of the material 206. In another example, the body portion 204 is sized to hold approximately two ounces of the material 206. Of course, the body portion 204 is not so limited to these quantities.

The material 206 includes any number of liquid, semi-liquid, gel, powder, foam based materials, etc. The material 206 includes, for example, cleaning materials such as sanitizers, antiseptics, soaps, moisturizers, or the like. In other examples, the material 206 may include water or other non-cleaning liquid materials. Indeed, the material 206 is not specifically limited to these examples, and could include any number of types of materials.

The container 202 includes a nozzle 208 for selectively restricting the ingress/egress of the material 206 into/out of the body portion 204. The nozzle 208 of FIG. 2 comprises only one of many different types of nozzles that can be used with the container 202. In this example, the nozzle 208 can be coupled (e.g., screwed onto) the body portion 204, with the nozzle 208 further including a removable cap. In other examples, however, the nozzle 208 could include a spray dispenser or nearly any other suitable dispensing nozzle configurations. The nozzle 208 can be selectively removed from the body portion 204 to allow for emptying and/or refilling of the container 202.

The container 202 further includes a keying feature 210. As will be described in more detail below, the keying feature 210 allows for only certain containers 202 to be used as part of the dispensing system 200. In this example, the keying feature 210 is positioned on a rear surface 212 of the container 202. In particular, the keying feature 210 is depicted with dashed lines to indicate the location of the keying feature 210 on the rear surface 212, since the keying feature 210 may not be visible in this view. Of course, the keying feature 210 is not limited to being disposed on the rear surface 212, and instead could be positioned on a side surface, front surface, within the container 202, or the like.

In the illustrated example, the keying feature 210 includes a conductive ink, conductive film and/or the like. The conductive ink and/or film can conduct electricity by allowing for current to pass through the conductive ink and/or film. The conductive ink and/or film includes nearly any type of ink and/or film material, such as silver, carbon, or other similar materials. The conductive ink can be applied to the container 202 in any number of ways, such as by spraying, coating, painting, or the like.

The dispensing system 200 further includes a housing 220 for removably supporting the container 202. In this example, the housing 220 can support the container 202 by receiving the container within the housing 220. The housing is not so limited, however. In other examples, the housing 220 could be support the container 202 by being removably coupled/attached to the container 202. In such an example, the housing 220 could include one or more attachment structures (e.g., mechanical fasteners, adhesives, etc.) for removably supporting the container 202.

The housing 220 includes a housing body 222. The housing body 222 extends longitudinally between a first end 224 and an opposing second end 226. The housing body 222 is surrounded by one or more walls so as to provide support to the dispensing system 200 and limit/reduce inadvertent damage to the housing body 222 and the container 202. In the illustrated example, the housing body 222 includes a rear wall 230 and opposing side walls 232 that extend between the first end 224 and second end 226. The housing body 222 is generally open at a front wall opposite the rear wall 230. In other examples, the housing body 222 is not limited to the structure of FIG. 2. Rather, the housing body 222 may be surrounded on all sides by walls (e.g., by including an interconnected front wall, rear wall, and side walls). Alternatively, the housing body 222 may include fewer walls than as illustrated and/or may include one or more non-solid, porous, void including, etc. walls. Any one or more indicia may be comprised within and/or placed upon the housing, such as product names, decals, advertisements, etc., for example.

Together, the rear wall 230 and side walls 232 bound a substantially hollow interior portion 233. The interior portion 233 is located within the housing body 222. In an example, the interior portion 233 has a cross-sectional size and shape that generally matches the cross-sectional size and shape of the body portion 204 of the container 202. As such, in operation, the interior portion 233 is sized/shaped to receive and hold the body portion 204. Due to the interior portion 233 matching the cross-sectional size/shape of the body portion 204, inadvertent movement/shaking of the container 202 with respect to the housing body 222 is relatively limited in this example.

The housing 220 includes a first opening 234 disposed at the first end 224 of the housing body 222. The first opening 234 may be generally sized and shaped to match a cross-sectional size/shape of the body portion 204 of the container 202. In particular, the first opening 234 may be slightly larger than the cross-sectional size of the body portion 204 so as to allow for the selective passage of the container 202 therethrough. As evidenced by the dashed lead lines extending from the housing 220 to the container 202, the container 202 is sized and shaped to pass through the first opening 234 and into the interior portion 233 of the housing body 222.

In the illustrated example, the first opening 234 has a generally rectangular shape with rounded edges so as to match the generally rectangular cross-sectional shape of the container 202. In other examples, however, the first opening 234 is not so limited. Rather, the first opening 234 may include other sizes/shapes that can match the size/shape of the container 202, including circular shapes, ovoid shapes, other quadrilateral shapes (e.g., square, rectangular, etc.) or the like. As such, the first opening 234 depicts only one of many possible examples.

The housing 220 further includes a second opening 236 disposed at the second end 226 of the housing body 222. The second opening 236 may be generally sized and shaped to match a cross-sectional size/shape of the nozzle 208. In particular, the second opening 236 may be slightly larger than the cross-sectional size of the nozzle 208 so as to allow for the selective passage of the nozzle 208 there-through.

Figure 3:
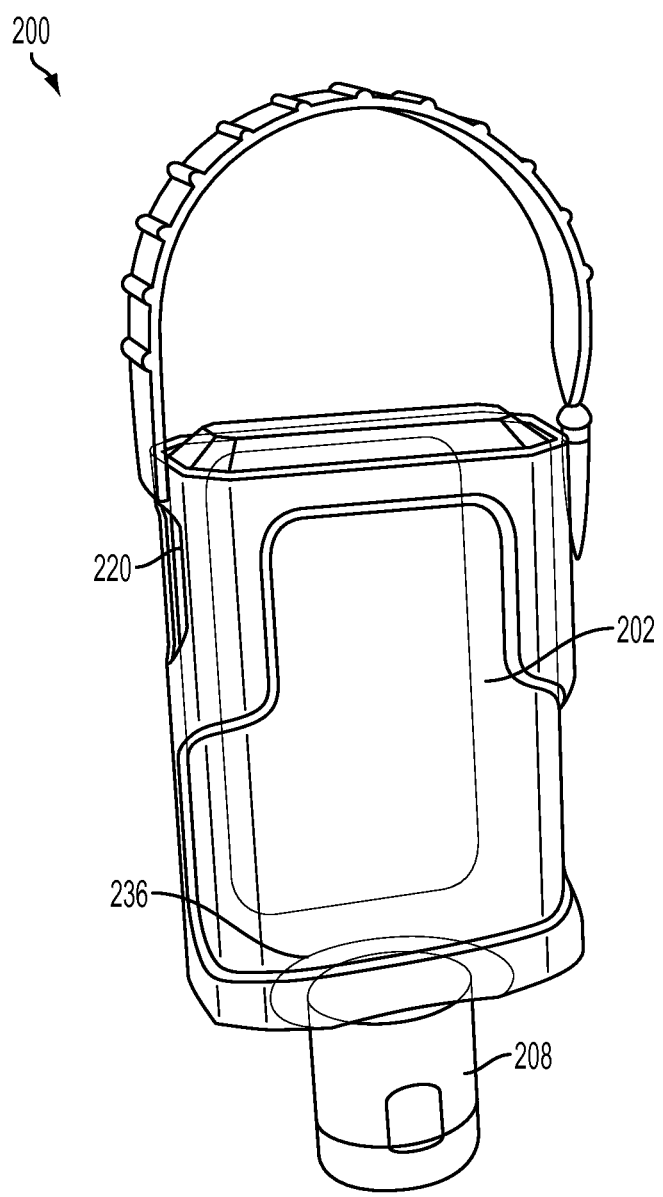
FIG. 3 is an illustration of an example dispensing system in which a container is supported by a housing.

Turning now to FIG. 3, the dispensing system 200 is illustrated in an assembled and operational state. In this example, the housing 220 supports the container 202 within the interior portion 233 of the housing 220. Further, the nozzle 208 is positioned to extend through the second opening 236. Accordingly, a user can manipulate and use the nozzle 208 while the container 202 is supported by the housing 220 to dispense the material 206. The housing also includes a handle or the like that allows the housing or dispensing system to be carried. For example, the handle may allow the housing to be attached to a backpack, purse, belt loop, etc. The housing may have a release or attachment mechanism that may allow at least some of the handle to be selectively disengaged from the rest of the housing. For example, an end of the handle may be disengaged so that that end of the handle can be threaded through a belt loop and then be reengaged to the remainder of the housing so that the dispensing system can be carried on a user's belt loop.

Figure 4:
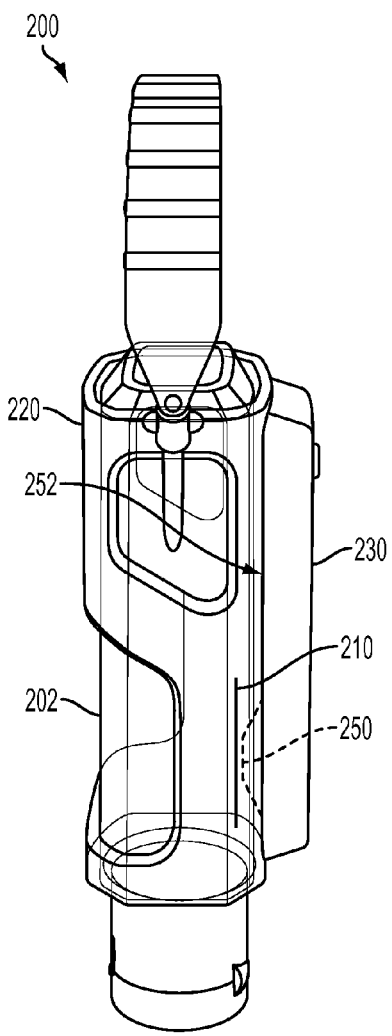
FIG. 4 is a side view illustrating an example dispensing system in which a container is supported by a housing.

Turning now to FIG. 4, a side view of the dispensing system 200 is illustrated. In this example, the housing 220 includes a mating portion 250 (e.g., also depicted in FIG. 2). The mating portion 250 is attached to an inner surface 252 of the rear wall 230 of the housing 220. The mating portion 250 can extend at least partially into the interior portion 233 of the housing body 222. It is to be appreciated that in this example, the mating portion 250 is depicted with dashed lines because the mating portion 250 is obscured from view by one of the side walls 232.

The mating portion 250 can contact and engage a portion of the container 202 when the container 202 is inserted into the housing 220. For example, the mating portion 250 can engage the keying feature 210 of the container 202. In an example, the mating portion 250 can include any number of materials, including electrically conductive materials such as metal. Further, the mating portion 250 can comprise a pair of electrical contacts. In operation, the pair of electrical contacts can each contact the conductive ink of the keying feature 210. This contact can function to close a circuit and allow for current to flow through a first one of the electrical contacts, through the conductive ink of the keying feature 210, and through the other of the electrical contacts (e.g., and ultimately back to the first electrical contact to complete the circuit).

In addition to the aforementioned features, the mating portion 250 can also provide at least some degree of force on the container 202. For example, in the illustrated example, the electrical contacts of the mating portion 250 may be mechanically biased. As such, the mating portion 250 can be at least partially elastically deformable. Accordingly, the mating portion 250 can contact the rear surface 212 of the container 202 and provide a force upon the body portion 204. This force tends to reduce inadvertent movement of the container 202 when positioned within the interior portion 233 of the housing 220. It will be appreciated that the instant application, including the scope of the appended claims, is not limited to the foregoing mating portion 250 and/or keying feature 210 as any of a variety of the same are contemplated herein.

Figure 5:
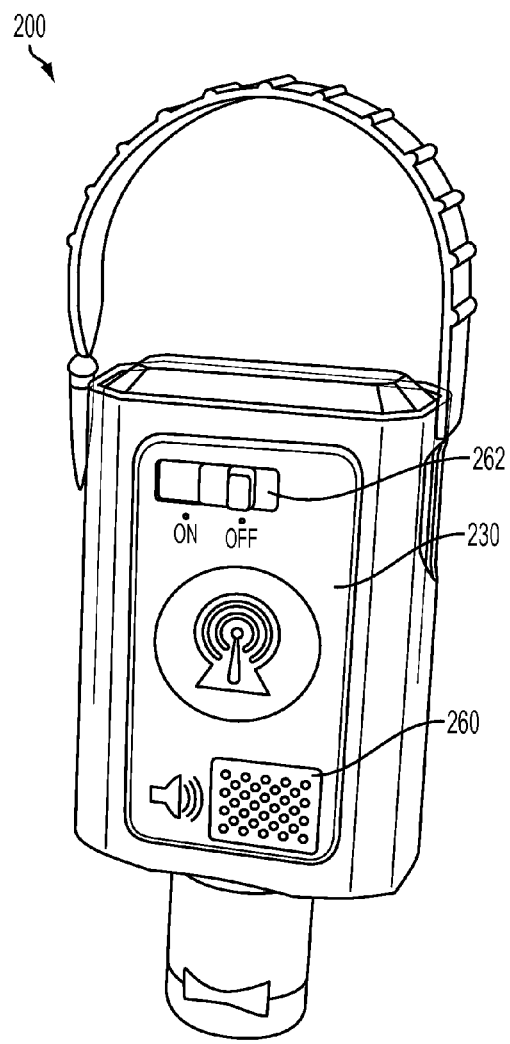
FIG. 5 is a rear view illustrating an example dispensing system in which a container is supported by a housing.

Turning now to FIG. 5, a rear view of the dispensing system 200 is illustrated. In particular, the rear wall 230 of the housing 220 is illustrated. The housing 220 in this example can include an audio device 260. The audio device 260 includes any number of structures associated with producing audio (e.g., spoken words, music, sounds, etc.). The audio device 260 may include, for example, speakers, microphones, or the like. While the audio device 260 is illustrated as being supported within the rear wall 230 of the housing 220, such a location is not intended to be limiting. Rather, the audio device 260 could be supported at nearly any location within the housing 220. As will be described in more detail below, the audio device 260 can audibly convey information, such as words, music, sounds, etc., to a user of the dispensing system

200. The dispensing system 200 can further include an on/off switch 262 for selectively turning on and off the dispensing system.

Figure 6:
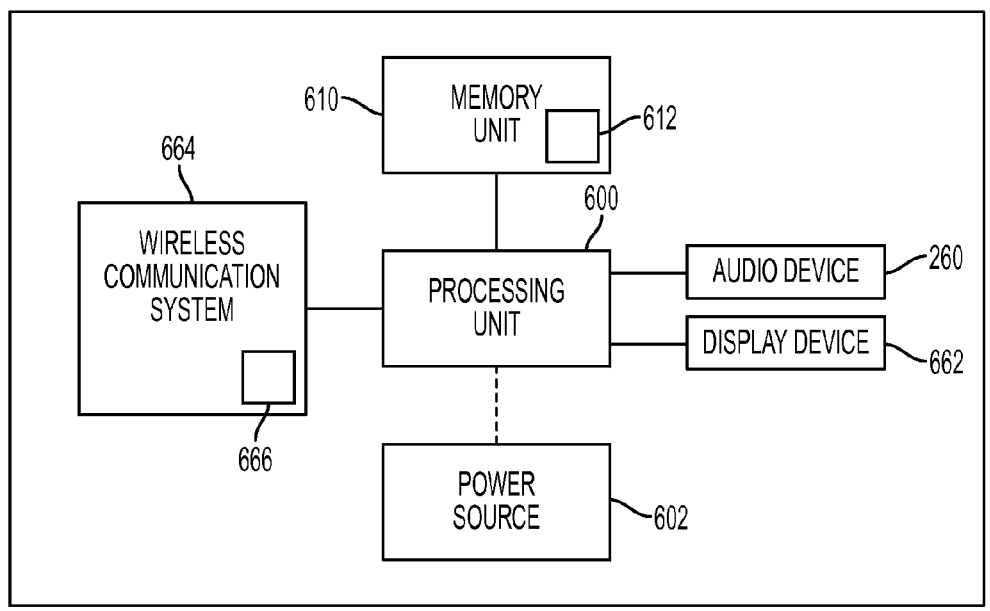
FIG. 6 is a component block diagram illustrating features within an example dispensing system.

Turning now to FIG. 6, a generic/schematic view of the dispensing system 200 is illustrated. In this example, at least some of the features illustrated in FIG. 6 may respectively be housed/supported by the housing 220. In other examples, however, some of these features may instead be supported by the container 202. In either example, the function of these features will remain generally the same.

The housing 220 can include a processing unit 600. The processing unit 600 includes any necessary hardware/software to carry out the functions described herein. The processing unit 600 includes, for example, chips, integrated circuits, processors, motherboards, external devices, or the like. In the illustrated example, the processing unit 600 can be relatively small in size (e.g., less than one square inch), so as to be supported by the housing 220.

The housing 220 can include a power source 602. The power source 602 includes any number of sources of electrical power, including batteries (e.g., double A, triple A, etc.), fuel cells, electrical energy transmission systems, solar or thermal power, etc. The power source 602 can supply electrical power to the housing 220 and, in particular, to respective the features/components illustrated in FIG. 6.

In the illustrated example, the power source 602 is operatively connected to the processing unit 600. The connection between the power source 602 and processing unit 600 is depicted, in part, with dashed lines. The dashed lines represent that the connection between the power source 602 and the processing unit 600 can be selectively interrupted. In particular, as described above with respect to the keying feature 210 and the mating portion 250, when the mating portion 250 of the housing 220 engages and contacts the keying feature 210 of the container 202, the housing 220 is activated. By being activated, the circuit between the power source 602 and the processing unit 600 is closed, such that power can be supplied to the processing unit 600 and/or other components of the housing 220.

In the alternative, the housing 220 may not be activated for a number of reasons. In an example, the container 202 may be inserted improperly (e.g., backwards, etc.), such that the mating portion 250 does not engage and contact the keying feature 210. In another example, a container that does not include the keying feature 210 could be inserted into the housing 220. In such an example, since the mating portion 250 does not contact the keying feature 210 (e.g., because the keying feature 210 is not present), the housing 220 is not activated. In both of these examples, since the housing 220 is not activated, the connection between the power source 602 and the processing unit 600 is opened, such that current will not flow from the power source 602 to the processing unit 600. Accordingly, the housing 220 can be selectively activated and powered when the keying feature 210 and mating portion 250 are in engagement and in contact.

The housing 220 can further include a memory unit 610. The memory unit 610 is operatively connected to the processing unit 600 and can temporarily and/or permanently store information. The memory unit 610 includes, for example, volatile and non-volatile memory, flash memory, ROM memory, RAM/DRAM memory, external memory sources, etc. Indeed, the memory unit 610 is not specifically limited to this non-exclusive list of types of memory, as any different type of memory unit is envisioned.

The memory unit 610 can store, for example, a first set of information 612. The first set of information 612 stored by the memory unit 610 can include information related to a user of the dispensing system 200. In an example, the first set of information 612 includes the name of the user of the dispensing system 200. The first set of information 612 could also include music, such as the user's favorite music or songs. In addition, the first set of information 612 could include any variety of sounds, such as animal sounds, car engine sounds, or the like. The first set of information can include information about one or more dispensing events that may have occurred or that may not have occurred when a dispensing event was expected to occur. Indeed, it is to be appreciated that the first set of information 612 stored by the memory unit 610 is not specifically limited to the aforementioned examples, and could include nearly any type of information.

The housing 220 further includes the audio device 260. As illustrated, the audio device 260 is operably connected to the processing unit 600. The audio device 260 may correspond to the audio device 260 described above with respect to FIG. 5. As such, the audio device 260 is not described in detail again. In general, the audio device 260 can include speakers, microphones, or the like for producing sound.

The housing 220 can further include a display device 662. The display device 662 can be operatively connected to the processing unit 600. The display device 662 can be supported at nearly any location within the housing 220 such as, for example, within the rear wall 230, side walls 232, etc. The display device 662 includes any number of structures associated with displaying information (e.g., words, text, images, video, etc.). The display device 662 may include, for example, a screen, monitor, lens, touch screen display, or the like. The display device 662 can display information in color, in black and white, or nearly any number of colors, fonts, text sizes, or the like. The display device 662 can display nearly any type of information, including the first set of information 612 stored in the memory unit 610. In an example, the display device 662 can be included in the housing 220 along with the audio device 260. In other examples, the housing 220 may include either the display device 662 or the audio device 260.

The housing 220 can further include a wireless communication system 664. The wireless communication system 664 is operatively connected to the processing unit 600. The wireless communication system 664 can be supported at nearly any location within the housing 220 such as, for example, within the rear wall 230, side walls 232, etc. The wireless communication system 664 includes any number of structures associated with transmitting and/or receiving information or data, including the first set of information 612. In an example, the wireless communication system 664 includes an antenna 666. It is to be appreciated that the antenna 666 is a relatively broad term/feature that can cover a number of different structures capable of transmitting and/or receiving information. For example, the antenna 666 can include radio frequency (RF) transmitters, receivers, transceivers, infrared (IR) transmitters and receivers, magnetic devices, etc.

The wireless communication system 664 comprises any number of short range wireless communication technologies. For example, the wireless communication system 664 includes near field communication (NFC), radio frequency identifiers (RFID), Bluetooth®, or the like. In the respective examples, the wireless communication system 664 can transfer (e.g., transmit, receive, etc.) information (e.g., first set of information 612 stored within the memory unit 610) between the dispensing system 200 and another device, tag, or the like that is in proximity to the dispensing system 200. The transfer of information can occur in either an active or passive manner. Additionally, the wireless communication system 664 can further communicate via a network, such as an IT network, LAN, WAN, Internet, etc.

Figure 7:
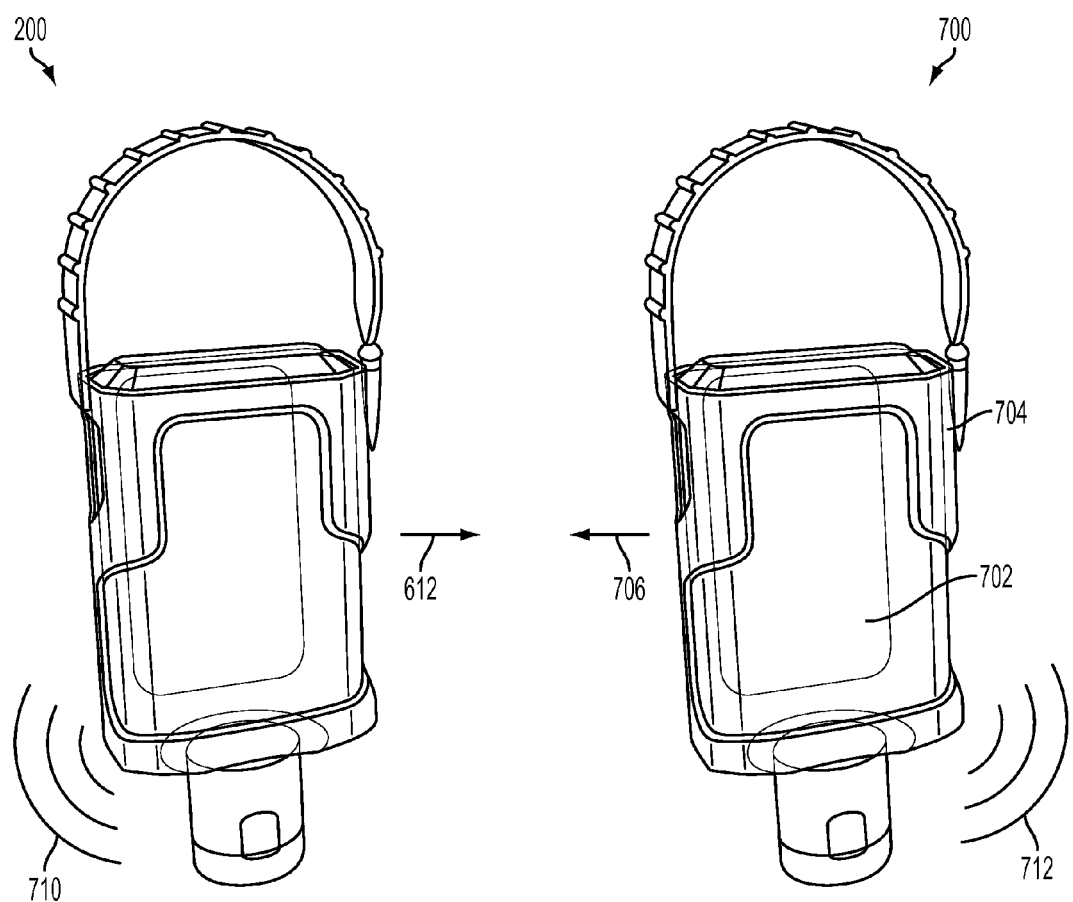
FIG. 7 is an illustration of an example method of operating a dispensing system and an example dispensing system.

Turning now to FIG. 7, an example of a method of operating the dispensing system 200 is illustrated. In this example, the dispensing system 200, being used by a user, can be positioned in proximity to a second dispensing system 700, being used by a second user. By being in proximity, it is understood that the distance between the dispensing system 200 and the second dispensing system 700 comprises any number of distances. In particular, the proximity can depend, at least in part, on the type of wireless communication system 664 that is being used (e.g., NFC, RFID, Bluetooth, etc.). In one possible example, the proximity can be from, approximately, 0 to 61 centimeters (~24 inches). Of course, other distances are envisioned, such as smaller or larger distances.

The second dispensing system 700 can be generally identical in structure and function as the dispensing system 200 described above. For example, the second dispensing system 700 includes a second container 702 that is generally identical to the container 202 described above with respect to the FIG. 2. Likewise, the second dispensing system 700 includes a second housing 704 that can removably support the second container 702. The second housing 704 is also generally identical to the housing 220 as described with respect to FIG. 2. Indeed, the second housing 704 may include at least some of the same structures as the housing 220, including the processing unit 600, power source 602, memory unit 610, audio device 260, display device 662, and wireless communication system 664. Accordingly, at least for these reasons, the features of the second dispensing system 700 need not be discussed in detail again. Nevertheless, one or more features, components, operations, etc. of the second dispensing system 700 may differ from that of the dispensing system 200.

In operation, the dispensing system 200 and second dispensing system 700 can be moved into proximity with each other, as illustrated. With each of the housing 220 and second housing 704 being turned on and activated, the wireless communication systems 664 of each of the housings can communicate with each other.

Focusing first on the transmitting/receiving of information, the wireless communication system 664 of the housing 220 can transmit at least some of the first set of information 612 (shown generically/schematically with arrowhead in FIG. 7) to the second housing 704. The first set of information 612 includes, for example, information related to the user of the dispensing system 200, such as the user's name, age, a greeting (e.g., "hello," "how are you doing," "my name is," etc.), a sound, audible message (e.g., sound, music clip, etc.), information relating to a dispensing event, a location of the user, etc. This first set of information 612 is received by the second housing 704.

Likewise, the wireless communication system of the second housing 704 can transmit at least some of a second set of information 706 (shown generically/schematically with arrowhead in FIG. 7) to the housing 220. The second set of information 706 includes, for example, information related to the second user of the second dispensing system 700, such as the second user's name, age, a greeting (e.g., "hello," "how are you doing," "my name is," etc.), a sound, audible message (e.g., sound, music clip, etc.), a request to monitor for dispensing events, a request for the first set of information, etc. The second set of information 706 is received by the housing 220.

Once the first set of information 612 and second set of information 706 have been transmitted to the respective dispensing systems, the dispensing system 200 and second dispensing system 700 can audibly or visually convey information to at least one of the users. Focusing first on the dispensing system 200, the audio device 260 can audibly convey 710 (shown generically/schematically) information to either or both of the user or second user. For example, the audio device 260 can audibly convey 710 at least some of the first set of information 612 to the second user since the second user is in proximity to the dispensing system 200. This first set of information 612 includes, for example, information related to the user, including the user's name, age, a greeting, a sound, song, or the like. In another example, the audio device 260 can audibly convey 710 at least some of the second set of information 706 to the user. This second set of information 706 includes, for example, the second user's name, age, a greeting a sound, song, or the like. Accordingly, the dispensing system 200 can facilitate an interaction between the user of the dispensing system 200 and the second user of the second dispensing system 700, for example.

Focusing now on the second dispensing system 700, the audio device 260 of the second dispensing system 700 can audibly convey 712 (shown generically/schematically) information to either or both of the user or second user. For example, the audio device 260 can audibly convey 712 at least some of the second set of information 706 to the user since the user is in proximity to the second dispensing system 700. In another example, the audio device 260 of the second dispensing system 700 can audibly convey 712 at least some of the first set of information 612 to the second user. Accordingly, the second dispensing system 700 can also facilitate an interaction between the user of the dispensing system 200 and the second user of the second dispensing system 700, for example.

In addition to the aforementioned audible conveyance, the dispensing system 200 and second dispensing system 700 can additionally or alternatively provide for visual conveyance of information. For example, the display device 662 can visually convey at least some of the first set of information 612 to the second user since the second user is in proximity to the dispensing system 200. Due to the close proximity, the second user can read the visual information (e.g., text/words, graphic, etc.). In another example, the display device 662 can visually convey at least some of the second set of information 706 to the user. Accordingly, as with the audio device 260, the visual device 662 of the dispensing system 200 can facilitate an interaction between the user of the dispensing system 200 and the second user of the second dispensing system 700, for example.

The second dispensing system 700 can also visually convey at least some of the first set of information 612 or second set of information 706. For example, the visual device 662 of the second dispensing system 700 can visually convey at least some of the second set of information 706 to the user since the user is in proximity to the second dispensing system 700. Due to the close proximity, the user can read the visual information (e.g., text/words, graphic, etc.). In another example, the visual device 662 of the second dispensing system 700 can visually convey at least some of the first set of information 612 to the second user. Accordingly, as with the audio device 260, the visual device 662 of the second dispensing system 700 can facilitate an interaction between the user of the dispensing system 200 and the second user of the second dispensing system 700, for example.

Figure 8:
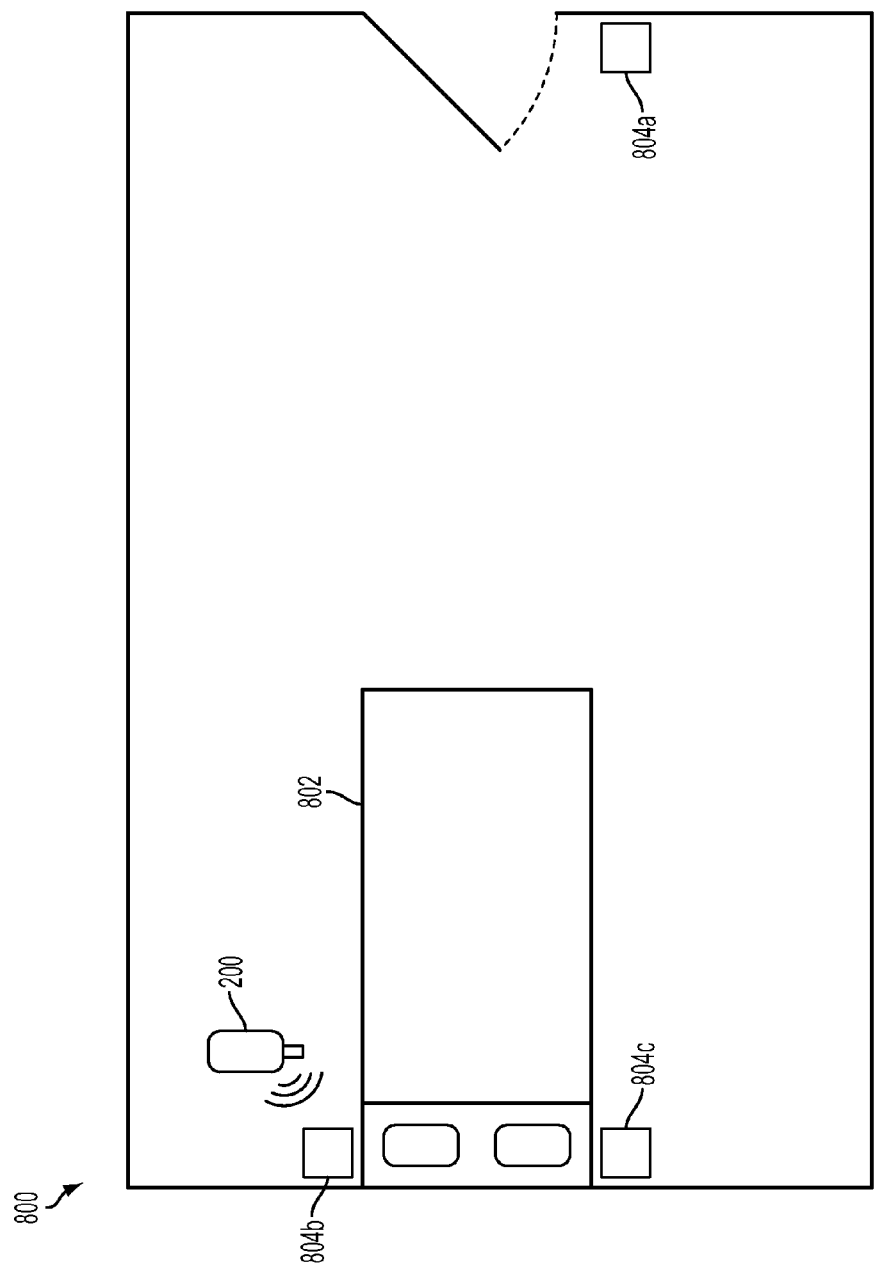
FIG. 8 is an illustration of an example environment in which an example dispensing system can be used.

Turning now to FIG. 8, the dispensing system 200 can also be used in an environment 800. The environment 800 is somewhat generically/schematically depicted as comprising a room, though it is to be appreciated that the environment 800 includes any number of environments, areas, etc. For example, the environment 800 can include hospitals, restaurants, hotels, schools, factories/warehouses, food processing facilities, areas which require hand washing, or the like.

Indeed, for ease of illustration, the environment 800 is illustrated as including only a single room with a bed 802, though in other examples, the environment 800 can include multiple rooms, buildings, indoor/outdoor environments, or the like.

One or more housings 804 can be provided in the environment. The housings 804 in this example are generically/schematically depicted and not drawn to scale. The housings 804 include any number of structures that can communicate with the dispensing system 200. For example, the housings 804 can include sensors, data tags (e.g., RFID tags, NFC tags, etc.), or the like. Further, the housings 804 can respectively include a tag identification that is unique to each of the housings. For example, a first housing 804a can include a first tag identification, while a second housing 804b includes a second tag identification and a third housing 804c includes a third tag identification, etc.

Each of the tag identifications can be associated with and/or related to a location within the environment 800. For example, the first housing 804a can be related to a location near a doorway, while the second housing 804b and the third housing 804c can be related to locations near the bed 802. The specific locations illustrated in FIG. 8 are not intended to be limiting, however. Instead, the housings 804 can be located at nearly any location within the environment 800, with any number of housings 804 (e.g., one or more) being provided.

The housings 804 can each interact with the dispensing system 200. For example, when the dispensing system 200 is in proximity to one of the housings 804, the dispensing system 200 can interrogate and obtain data from the housings 804. In an example, the dispensing system 200 can receive the tag identification of one of the housings 804 when the dispensing system 200 interrogates that particular housing 804. The dispensing system 200 can store this information (e.g., tag identification) in the memory unit 610 of the dispensing system 200. In addition to storing the tag identification, the memory unit 610 can also store other information related to the interrogation of the housings 804 by the dispensing system 200. For example, the memory unit 610 can store a date and time of the interrogation (e.g., the date/time that the tag identification was obtained), the number of times the housings 804 were interrogated, or the like.

In operation, a user can the dispensing system 200 can enter the environment 800. The user can enter through the doorway, and pass by the first housing 804a. By passing in proximity to the first housing 804a, the dispensing system 200 can interrogate the first housing 804a and receive information (e.g., tag identification, date, time, etc.) from the first housing 804a. This information can be stored in the memory unit 610 of the housing 220. The user may then move in proximity to either or both of the second housing 804b and third housing 804c. In such an example, the dispensing system 200 can interrogate either or both of the second housing 804b and third housing 804c The dispensing system 200 will receive information from either/both of the second housing 804b and third housing 804c and store this information in the memory unit 610. As such, the dispensing system 200, in particular the housing 220, can track the location of the user of the dispensing system 200.

Figure 9:
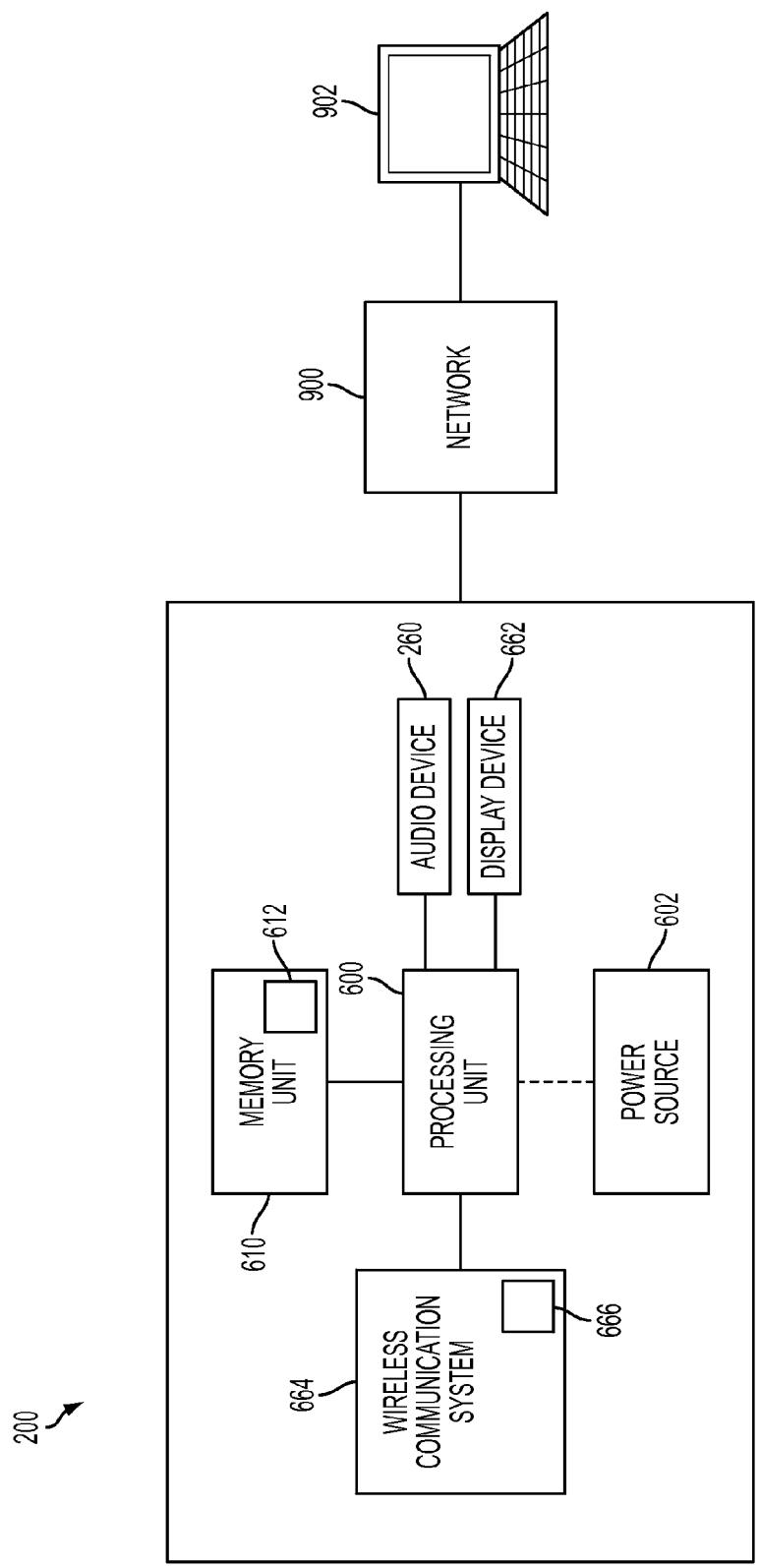
FIG. 9 is a component block diagram illustrating an example dispensing system in use within an example environment.

Turning now to FIG. 9, an example of a method of operating the dispensing system 200 with respect to the environment 800 is illustrated. In this example, the features of the dispensing system 200 (e.g., processing unit, memory unit, power source, wireless communication system, etc.) generally correspond to those described above with respect to FIG. 6. The memory unit 610 again includes the first set of information 612. In this example, the first set of information 612 may include information related to the housings 804. For example, the information received through the wireless communication system 664 of the dispensing system 200 from the housings 804 can be stored in the memory unit 610. The first set of information 612 can therefore include information related to each of the first housing 804a, second housing 804b, third housing 804c, etc. This first set of information 612 includes the unique tag identifications which are related to locations within the environment 800, dates/times that the tag identification is received, etc.

The dispensing system 200 can communicate with a network 900. The network 900 includes, for example, a local area network (LAN), wide area network (WAN), wireless local area network (WLAN), the internet, etc. At least one computing device 902 can be operatively connected to the network 900. The computing device 902 is somewhat generically/schematically depicted, as the computing device 902 includes any number of devices. For example, the computing device 902 may include nearly any type of computer (e.g., portable computer, laptop, desktop, etc.), mobile device (e.g., mobile phone, tablet, etc.), or the like. It will be appreciated that the network 900 and/or computing device 902 may comprise or be comprised by a housing or dispensing system.

In operation, at least a portion the first set of information 612 can be selectively transmitted to and/or received by the computing device 902 through the network 900. For example, the first set of information 612 includes the unique tag identification(s) of the housings, indicating that the user of the dispensing system 200 was in proximity to that particular housing. Likewise, the first set of information 612 may also include the time/date for when each unique tag identification was obtained. At least some of this first set of information 612 can be transmitted through the network 900 to the computing device 902.

In an example, a person using the computing device 902 can determine whether the user, such as a hospital employee, has been within the environment 800 and likely cleaned certain areas, such as the bed, bathroom, door knobs, etc. The person using the computing device 902 can likewise identify areas within the environment 800 that have been overlooked due to a missing unique tag identification corresponding to a housing in that particular area. This monitoring can be beneficial in areas that implement cleaning, washing, and/or sanitizing, so as to determine if desired areas have been accessed and/or cleaned.

Figure 10:
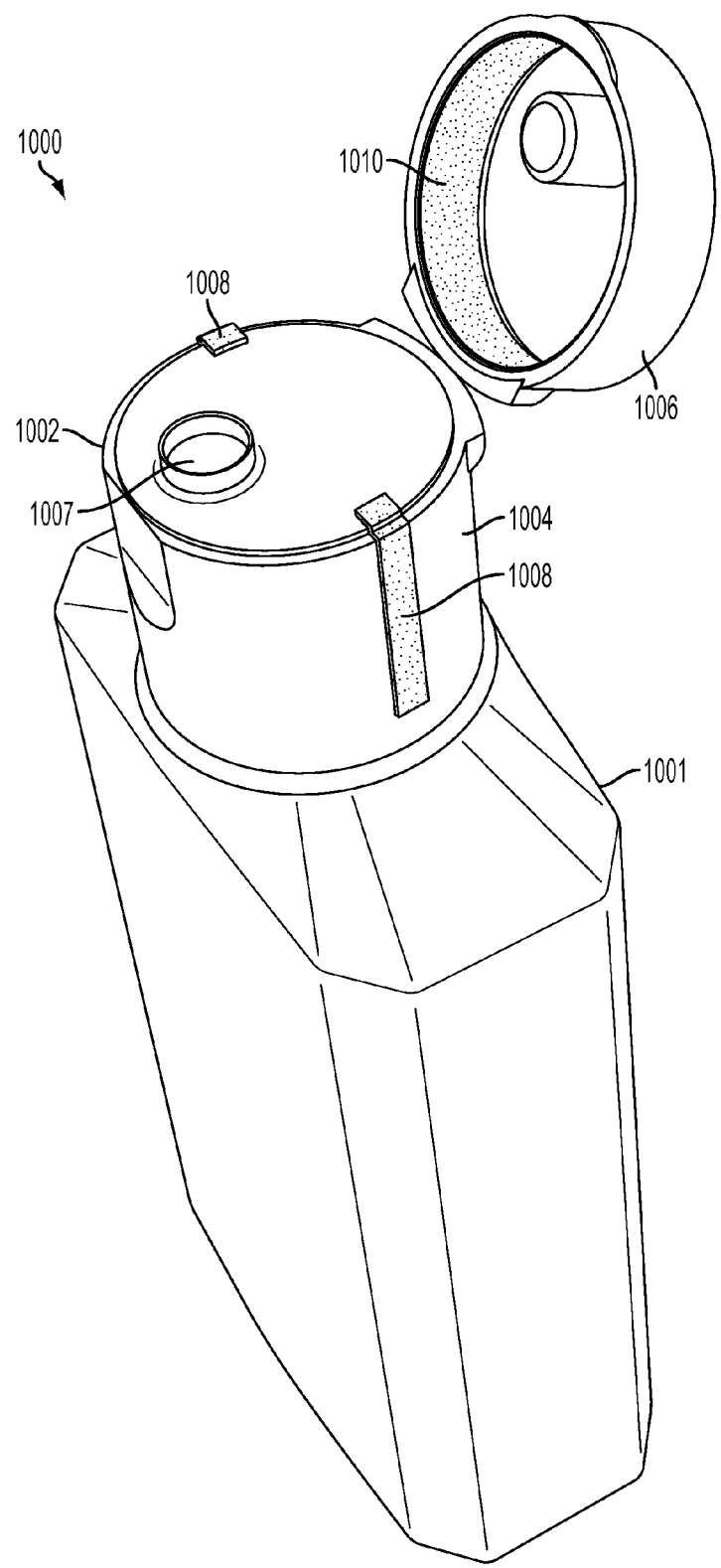
FIG. 10 is an illustration of an example container that can detect a dispense event.

Turning now to FIG. 10, a second example container 1000 is illustrated. In this example, the second container 1000 can be used with the dispensing system 200 and housing 220 described above. Further, the second container 1000 can be used within the environment 800 and in association with the network 900 and computing device 902 described above. In at least an example, the second container 1000 can have a generally identical size and shape as the container 202, such that the second container 1000 can be received within the housing 220.

The second container 1000 includes an example of a second nozzle 1002 attached to a body portion 1001. The body portion 1001 is generally identical to the body portion 204 described above. Indeed, the body portion 1001 can store the material 206 and selectively dispense the material 206. As such, the body portion 1001 need not be described in detail again.

The second nozzle 1002 can be removably attached to the body portion 1001. The second nozzle 1002 can be attached in any number of ways, such as by a threaded attachment, snap fit means, fasteners, or the like. The second nozzle 1002 includes a cap portion 1004 and a cover portion 1006. The cap portion 1004 includes an opening 1007 to allow for selective dispensing of the material 206 within the second container 1000.

The cap portion 1004 can also include a pair of electrical contacts 1008. In this example, the electrical contacts 1008 are disposed on opposing sides of the cap portion 1004. However, the electrical contacts 1008 are not limited to this location, and could instead be positioned at any number of locations on the cap portion 1004. In an example, the electrical contacts 1008 can be deposited onto the cap portion 1004 by printing, spraying, or the like. In such an example, the electrical contacts 1008 may comprise conductive ink. In another example, the electrical contacts 1008 can be insert molded/attached to the cap portion 1004. Indeed, any number of ways of applying the electrical contacts 1008 are envisioned, and are not limited to the examples specifically listed herein.

The cover portion 1006 can be removably attached to the cap portion 1004. In an example, the cover portion 1006 can be hingedly attached to the cap portion 1004, such that the cover portion 1006 selectively limits dispensing of the material 206 contained within the body portion 1001. The cover portion 1006 is not limited to such an attachment, and in other examples, could be attached by way of threading, snap fit means, or the like.

The cover portion 1006 can include a conductive layer 1010 positioned along a surface of the cover portion 1006. In the illustrated example, the conductive layer 1010 is disposed on an inner surface of the cover portion 1006 and can extend generally circumferentially around the entire inner surface. The conductive layer 1010 includes any number of materials that can conduct electricity, including metals, or the like. In an example, the conductive layer 1010 can include conductive ink that may be applied by spraying, coating, or the like.

In operation, the electrical contacts 1008 can each be electrically connected to a monitor, sensor, or other similar monitoring device located within the housing 220. When the cover portion 1006 is in a closed position and is fully attached to the cap portion 1004, the conductive layer 1010 can contact the electrical contacts 1008. Accordingly, the circuit from the electrical contacts 1008 and through the conductive layer 1010 is closed. A user may selectively open the cover portion 1006 to the position illustrated in FIG. 10. The user may open the cover portion 1006 to dispense the material 206 and, for example, wash his/her hands, wash a surface, or partake in any number of cleaning events. When the cover portion 1006 is opened, the monitor, sensor, monitoring device, etc. can detect that the circuit is opened, and that a dispense event is occurring or has occurred. Information related to this dispense event (e.g., date, time, location, etc.) can then be transferred (e.g., as a first set of information) to the computing device 902 through the network 900, such that the dispense events can be monitored.

Figure 11:
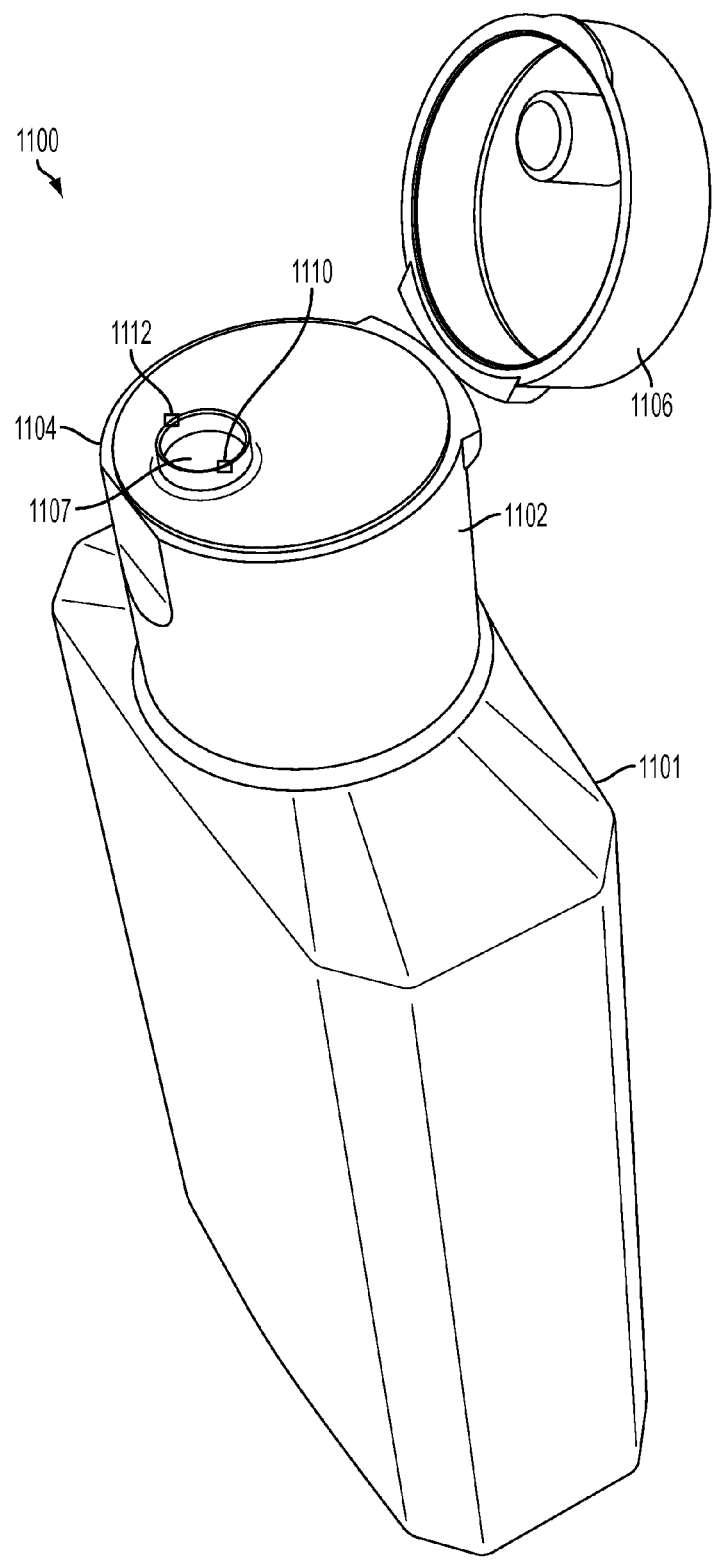
FIG. 11 is an illustration of an example container that can detect a dispense event.

Turning now to FIG. 11, a third example container 1100 is illustrated. In this example, the third container 1100 can be used with the dispensing system 200 and the housing 220 described above. Further, the third container 1100 can be used within the environment 800 and in association with the network 900 and computing device 902 described above. In at least an example, the third container 1100 can have a generally identical size and shape as the container 202, such that the third container 1100 can be received within the housing 220.

In this example, the third container 1100 includes an example of a third nozzle 1102 attached to a body portion 1101. The body portion 1101 is generally identical to the body portions 204, 1001 described above. Indeed, the body portion 1101 can store the material 206 and selectively dispense the material 206. As such, the body portion 1101 need not be described in detail again.

The third nozzle 1102 can be removably attached to the body portion 1101. The third nozzle 1102 can be attached in any number of ways, such as by a threaded attachment, snap fit means, fasteners, or the like. The third nozzle 1102 includes a cap portion 1104 and a cover portion 1106. The cap portion 1104 includes an opening 1107 to allow for selective dispensing of the material 206 within the third container 1100.

In this example, the cap portion 1104 includes a pair of sensors for detecting a dispense event (e.g., when material 206 is dispensed from the third container 1100). In an example, the sensors include an emitter 1110 disposed on one side of the opening 1107 and a detector 1112 disposed on an opposing second side of the opening 1107. It is to be appreciated that the emitter 1110 and detector 1112 are depicted somewhat generically/schematically in FIG. 11, as the emitter 1110 and detector 1112 include any number of sizes, shapes, and structures. The emitter 1110 and detector 1112 can be attached adjacent the opening 1107.

In operation, the emitter 1110 can emit a beam to the detector 1112. The beam can include, for example, a light beam, laser beam, or any other source of light energy that can be received and detected by the detector 1112. The beam can be directed towards the detector 1112. In an example, the beam may normally be broken and not detected by the detector 1112 when the cover portion 1106 is closed and positioned on the cap portion 1104. As such, when the cover portion 1106 is opened, the beam is detected by the detector 1112, and a dispense event can be recorded. In another example, the beam can be used to selectively detect the passage of the material 206 through the opening 1107. In such an example, the detector 1112 can detect changes in the beam, such as intensity, focus, or the like, when the material 206 passes through the beam. In either of these examples, the detector 1112 is able to determine when the cover portion 1106 is opened and/or when the material 206 is dispensed from the third container 1100, both of these events being indicative of a dispense event. As with the example of FIG. 10, information related to this dispense event (e.g., date, time, location, etc.) can then be transferred (e.g., as a first set of information) to the computing device 902 through the network 900, such that the dispense events can be monitored.

It will be appreciated that such emitters and detectors can likewise be outfitted into the housing 220. For example the housing could have portions that extend from the bottom of the second end 226 of the housing, where distal ends of these portions extend past the nozzle 208, or opining(s) therein, from which material leaves the container. An emitter could be situated in a distal end of a first extended portion and a detector could be situated in a distal end of a second extended portion, where the first extended portion is substantially diametrically opposite the second extended portion relative to the second opening 236, for example. In this manner, when material is dispensed, a change in light or signal emitted from the emitter could be detected by the detector and thus the housing could monitor for and detect dispensing events, which can be stored in memory and transmitted as the first set of information, for example. It will be appreciated that the emitter and/or detector may be powered by the power source 602 and/or operatively coupled to the processing unit 600, for example, for operating purposes, for example.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A dispensing system, comprising:
    a housing configured to removably support a container within which a material is contained and from which the material is dispensed, the housing comprising a mating portion configured to engage a keying feature of the container to activate the housing when the housing supports the container, the housing not activated when the housing does not support the container such that the mating portion does not engage the keying feature, wherein the housing is electrically connected to the container when the mating portion engages the keying feature, the housing comprising:
        a carrying mechanism configured to allow the housing to be carried by a user of the dispensing system; and
        a wireless communication system configured to transmit a first set of information related to the user of the dispensing system.

2. The dispensing system of claim 1, wherein the wireless communication system is configured to transmit the first set of information to a second housing of a second dispensing system, and receive a second set of information from the second housing, the second set of information related to a second user of the second dispensing system.

3. The dispensing system of claim 2, comprising an audio device for audibly conveying at least one of at least some of the first set of information to the second user or at least some of the second set of information to the user.

4. The dispensing system of claim 2, comprising a visual device for visually conveying at least one of at least some of the first set of information to the second user or at least some of the second set of information to the user.

5. The dispensing system of claim 1, wherein the keying feature is unique to the container and disposed on a surface of the container.

6. The dispensing system of claim 1, wherein the mating portion is configured to apply a force to the container to support the container within the housing.

7. The dispensing system of claim 1, wherein the keying feature comprises at least one of a conductive ink or a conductive film through which the housing is electrically connected to the container when the mating portion engages the keying feature.

8. The dispensing system of claim 1, the container comprising:
    a cap portion comprising an electrical contact; and
    a cover portion attached to the cap portion and movable between an opened position, in which the cover portion does not cover an opening in the cap portion, and a closed position, in which the cover portion covers the opening in the cap portion, the cover portion comprising an electrically conductive portion configured to selectively create an electrical connection with the electrical contact of the cap portion when the cover portion is moved between the opened position and the closed position, wherein the first set of information is indicative of the electrical connection.

9. The dispensing system of claim 1, wherein the housing defines a first opening at a first end of the housing, the first opening having an opening cross-sectional shape that substantially matches a container cross-sectional shape of the container, the housing configured to receive the container through the first opening such that the container is removably supported by the housing.

10. A dispensing system, comprising:
    a housing configured to removably support a container within which a material is contained and from which the material is dispensed, the housing configured to store a first set of information related to a user of the dispensing system, the housing comprising:
        a carrying mechanism configured to allow the housing to be carried by the user of the dispensing system;
        a mating portion configured to engage a keying feature of the container to activate the housing when the housing supports the container, wherein, when the housing is activated, electric current flows between the mating portion and the keying feature;
        a wireless communication system configured to transmit the first set of information to a second housing and receive a second set of information from the second housing when the housing is in proximity to the second housing when the housing is activated; and
    at least one of:
        an audio device for audibly conveying at least one of:
            at least some of the first set of information to a second user of the second housing, or
            at least some of the second set of information to the user, or
        a visual device for visually conveying at least one of:
            at least some of the first set of information to the second user, or
            at least some of the second set of information to the user.

11. The dispensing system of claim 10, wherein the keying feature is unique to the container and disposed on a surface of the container.

12. The dispensing system of claim 10, wherein the mating portion is configured to apply a force to the container to support the container within the housing.

13. The dispensing system of claim 12, wherein the mating portion comprises mechanically biased electrical contacts.

14. The dispensing system of claim 10, wherein the keying feature comprises at least one of a conductive ink or a conductive film.

15. A method of operating a dispensing system, comprising:
- receiving into a housing a container within which a material is contained and from which the material is dispensed, the container received such that a keying feature of the container engages a mating portion of the housing to activate the housing by electrically connecting the housing to the container such that electric current flows between the mating portion and the keying feature, the housing comprising a carrying mechanism for allowing the housing to be carried by a user of the dispensing system;
- maintaining a first set of information related to the user of the dispensing system within the housing; and
- at least one of transmitting the first set of information to a second housing that is in proximity to the housing or receiving a second set of information from the second housing when the housing is activated.

16. The method of claim 15, wherein the second set of information is related to a second user of a second dispensing system comprising the second housing.

17. The method of claim 16, comprising audibly conveying at least one of at least some of the first set of information to the second user or at least some of the second set of information to the user.

18. The method of claim 16, comprising visually conveying at least one of at least some of the first set of information to the second user or at least some of the second set of information to the user.

19. The method of claim 15, wherein the second set of information is related to a location of at least one of the housing or the second housing.

20. A dispensing system, comprising:
- a housing configured to removably support a container within which a material is contained and from which the material is dispensed, the housing comprising:
  - a carrying mechanism configured to allow the housing to be carried by a user of the dispensing system; and
  - a wireless communication system configured to transmit a first set of information related to the user of the dispensing system;
- the container comprising:
  - a cap portion comprising an electrical contact; and
  - a cover portion attached to the cap portion and movable between an opened position, in which the cover portion does not cover an opening in the cap portion, and a closed position, in which the cover portion covers the opening in the cap portion, the cover portion comprising an electrically conductive portion configured to selectively create an electrical connection with the electrical contact of the cap portion when the cover portion is moved between the opened position and the closed position, wherein the first set of information is indicative of the electrical connection.

21. The dispensing system of claim 20, wherein the electrically conductive portion comprises a conductive ink.

* * * * *